(12) United States Patent
Kang et al.

(10) Patent No.: US 9,857,933 B2
(45) Date of Patent: Jan. 2, 2018

(54) SENSING DEVICE, CONTROL METHOD THEREOF, AND RECORDING MEDIUM

(71) Applicant: Samsung Electronics Co., Ltd., Gyeonggi-do (KR)

(72) Inventors: Byung-Hoon Kang, Gyeonggi-do (KR); Kang-Min Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 29 days.

(21) Appl. No.: 14/822,244

(22) Filed: Aug. 10, 2015

(65) Prior Publication Data

US 2016/0041660 A1   Feb. 11, 2016

(30) Foreign Application Priority Data

Aug. 8, 2014 (KR) .......................... 10-2014-0102500

(51) Int. Cl.
  *G06F 3/041* (2006.01)
  *G06F 3/046* (2006.01)
(52) U.S. Cl.
  CPC .................................. *G06F 3/046* (2013.01)
(58) Field of Classification Search
  CPC ........... G06F 3/041; G06F 3/046; G06F 3/044
  See application file for complete search history.

(56) References Cited

U.S. PATENT DOCUMENTS

| | | | |
|---|---|---|---|
| 2013/0176071 A1* | 7/2013 | Kim | ....................... H03K 17/96 |
| | | | 327/517 |
| 2013/0201152 A1 | 8/2013 | Kim et al. | |
| 2015/0277591 A1* | 10/2015 | Lu | .......................... G01B 7/004 |
| | | | 345/173 |

FOREIGN PATENT DOCUMENTS

KR    1020130091440    8/2013

* cited by examiner

*Primary Examiner* — Dennis Joseph
(74) *Attorney, Agent, or Firm* — The Farrell Law Firm, P.C.

(57) ABSTRACT

Disclosed are an electronic device, a control method thereof, and a recording medium. The electronic device includes a first loop unit configured to sense a first signal relating to an input of the touch object, a second loop unit configured to sense a second signal relating to the input of the touch object, and a controller configured to determine a sensing area including the location where the input is received based on the first signal and to determine the input location included in the determined sensing area based on the second signal.

13 Claims, 12 Drawing Sheets

SENSING DEVICE, CONTROL METHOD THEREOF, AND RECORDING MEDIUM

PRIORITY

This application claims priority under 35 U.S.C. §119(a) to Korean Application Serial No. 10-2014-0102500, which was filed in the Korean Intellectual Property Office on Aug. 8, 2014, the contents of which are incorporated herein by reference.

BACKGROUND OF THE INVENTION

1. Field of the Invention

The present invention relates to a sensing device, a control method thereof, and a recording medium.

2. Description of the Related Art

Due to the recent proliferation of electronic devices, such as smart phones, the development of technologies relating to sensing functions/operations of a touch screen mounted in the smart phones has steadily increased. In order to input a specific command in relation to a smart phone or a touch screen, a user may input the specific command or designate a specific icon by touching with a finger or a stylus pen using an Electromagnetic Induction (EI) (hereinafter, electromagnetic induction pen) to a specific location of the touch screen.

In order to utilize the stylus pen using electromagnetic induction, a loop coil is disposed in the electronic device, and a control is made such that voltage is applied to the loop coil to generate an electromagnetic field that is transferred to the electromagnetic induction pen. The electromagnetic induction pen includes a capacitor and a loop, and converts the transferred electromagnetic field into an electromagnetic field having a predetermined frequency component to be re-discharged.

The discharged electromagnetic field from the electromagnetic induction pen is re-transferred to the loop coil of the circuit board, which makes it possible to determine a location where the electromagnetic induction pen closely approaches the touch screen.

In conventional electromagnetic induction methods, channels for processing input and output signals have to be assigned to all loop coils included in a circuit board of an electronic device in order to apply an electromagnetic field to the electromagnetic induction pen. When a plurality of loop coils exists on the circuit board, a plurality of channels are required, which leads to an increase in the amount of calculation for processing signals from the plurality of channels. In addition, a high-performance processor may be required to process the increasing calculation, which is burdensome on firmware.

Furthermore, when a touch location is determined through the electromagnetic induction methods, if the area of a display for which the touch screen is employed increases, such as an electronic bulletin board, the strength of signals decreases toward the central portion of the touch screen due to the arrangement of multiple coils, rendering it difficult to accurately determine the touch location.

SUMMARY OF THE INVENTION

The present invention has been made to address the above-mentioned problems and disadvantages, and to provide at least the advantages described below.

Accordingly, an aspect of the present invention is to provide a sensing device that can accurately determine an input location of a touch object with fewer channels, a control method thereof, and a recording medium.

Another aspect of the present invention is to provide a sensing device that can accurately determine a touch location on a touch screen even though the area of a display constituted with the touch screen increases to a size greater than that of an electronic device such as a smart phone, a control method thereof, and a recording medium.

According to an aspect of the present invention, an electronic device includes a first loop unit configured to sense a first signal relating to an input of the touch object, a second loop unit configured to sense a second signal relating to the input of the touch object, and a controller configured to determine a sensing area including the location where the input is received based on the first signal and to determine the input location included in the determined sensing area based on the second signal.

According to another aspect of the present invention, a control method of an electronic device includes sensing a first signal relating to an input of the touch object through a first loop unit, sensing a second signal relating to the input of the touch object through a second loop unit, and determining a sensing area including a location where the input is received based on the first signal and determining the input location included in the determined sensing area based on the second signal.

According to another aspect of the present invention, a non-transitory computer readable recording medium is provided having recorded thereon instructions configured to perform at least one operation by a processor, wherein the at least one operation comprises sensing a first signal relating to an input of the touch object through a first loop unit, sensing a second signal relating to the input of the touch object through a second loop unit, and determining a sensing area including a location where the input is received based on the first signal and determining the input location included in the determined sensing area based on the second signal.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Figure 1:
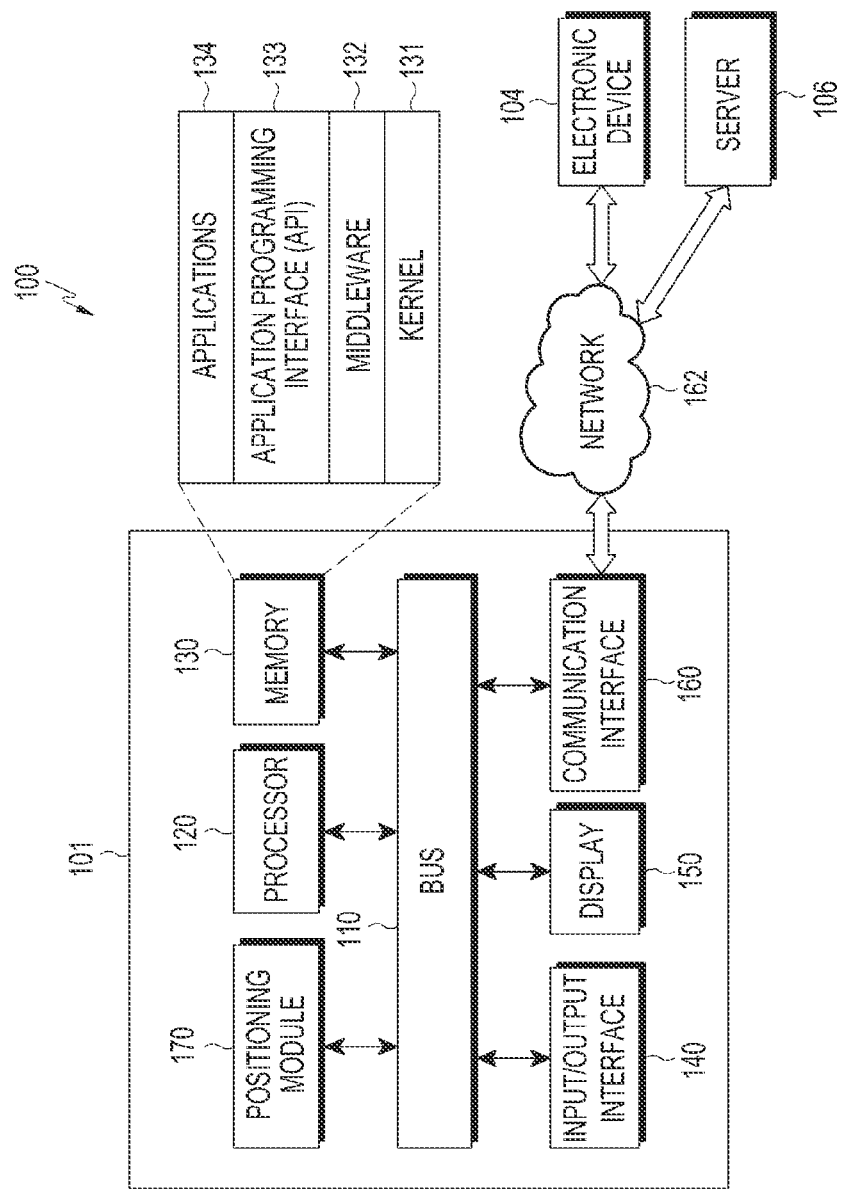
FIG. 1 illustrates a network environment including an electronic device to which a sensing device or a control method for the sensing device may be applied, according to embodiments of the present invention.

Embodiments of the present invention will be described in reference to the accompanying drawings. Although the present invention may be modified in various forms, specific examples are illustrated in the drawings and described in the description. However, the description is not intended to limit the present invention to the specific embodiments, and it shall be appreciated that all the changes, equivalents and substitutions belonging to the idea and technical scope of the present invention are included in the present disclosure. In the description of the drawings, identical or similar reference numerals are used to designate identical or similar elements. In describing the present invention, well-known functions or constructions are not described in detail for the sake of clarity and conciseness.

The terms "include" or "may include" refer to the existence of a corresponding disclosed function, operation or component which can be used in embodiments of the present invention and does not limit one or more additional functions, operations, or components. In the present invention, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in embodiments of the present disclosure includes any or all of combinations of listed words. For example, the expression "A or B" may include A, B, or both A and B.

The expressions "1", "2", "first", or "second" used in embodiments of the present invention may modify various components of embodiments but do not limit the corresponding components. For example, the above expressions do not limit the sequence and/or importance of the elements. The above expressions are used merely for the purpose of distinguishing an element from the other elements. For example, a first user device and a second user device indicate different user devices, although both are user devices. For example, without departing from the scope of the present invention, a first component element may be referred to as a second component element, and the second component element may be referred to as the first component element.

It should be noted that if it is described that one component element is "coupled" or "connected" to another component element, the first component element may be directly coupled or connected to the second component element, and a third component element may be "coupled" or "connected" between the first and second component elements. Conversely, when one component element is "directly coupled" or "directly connected" to another component element, it may be construed that a third component element does not exist between the first and second component elements.

The terms in embodiments of the present disclosure are used to describe a specific embodiment, and are not intended to limit the present invention. As used herein, singular forms are also intended to include plural forms, unless the context clearly indicates otherwise.

Unless defined differently, all terms used herein, which include technical terminologies or scientific terminologies, have the same meaning as understood by a person skilled in the art to which the present invention belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

An electronic device according to embodiments of the present invention has a communication function. For example, the electronic device includes at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a MP3 player, a mobile medical device, a camera, a wearable device such as a head-mounted-device (HMD), electronic glasses, electronic clothes, an electronic bracelet, an electronic necklace, an electronic appcessory, an electronic tattoo, or a smart watch.

According to some embodiments, the electronic device may be a smart home appliance with a communication function, such as a television, a Digital Video Disk (DVD) player, an audio device, a refrigerator, an air conditioner, a vacuum cleaner, an oven, a microwave oven, a washing machine, an air cleaner, a set-top box, a TV box such as Samsung HomeSync™, Apple TV™, or Google TV™, a game console, an electronic dictionary, an electronic key, a camcorder, and an electronic picture frame.

According to some embodiments, the electronic device includes at least one of various medical devices such as a Magnetic Resonance Angiography (MRA) scanner, a Magnetic Resonance Imaging (MRI) scanner, a Computed Tomography (CT) scanner, a scanner, an ultrasonograph, a navigation device, a Global Positioning System (GPS) receiver, an Event Data Recoder (EDR), a Flight Data Recoder (FDR), a vehicle infotainment device, an electronic equipment for ship, such as a ship navigation device or gyro-compass, avionics, a security device, a head unit for a vehicle, an industrial or household robot, an Automatic Teller Machine (ATM) in banking facilities or a Point Of Sales (POS) in stores.

According to some embodiments, the electronic device includes at least one of furniture or a part of a building/structure, an electronic board, an electronic signature receiving device, a projector, and various types of measuring devices such as a water, electric, gas or radio wave meter including a camera function. An electronic device according to embodiments of the present invention may be a combination of one or more of above described various devices, may be a flexible device, and is not limited to the above described devices.

The term "user" used in embodiments may refer to a person who uses an electronic device or a device (for example, an artificial intelligence electronic device) that uses an electronic device.

According to the sensing device and the control method thereof, in accordance with the embodiments of the present invention, an input location of a touch object can be accurately determined through fewer channels.

In addition, even though the area of a display constituted with a touch screen increases than that of an electronic device such as a smart phone, a touch location on the touch screen can be accurately determined.

FIG. 1 illustrates a network environment including an electronic device to which a sensing device or a control method for the sensing device may be applied, according to embodiments of the present invention.

Referring to FIG. 1, the electronic device 101 includes a bus 110, a processor 120, a memory 130, an input/output interface 140, a display 150, a communication interface 160, and a positioning module 170.

The bus 110 is a circuit that interconnects and transfers communication between the above-described elements.

The processor 120 receives instructions through the bus 110 from the other elements of the electronic device 101, decodes the received instructions, and performs calculation or data processing according to the decoded instructions.

The memory 130 stores instructions or data received from or generated by the processor 120 or the other elements. The memory 130 includes programming modules, such as a kernel 131, middleware 132, an Application Programming Interface (API) 133, and applications 134. The aforementioned programming modules may be configured with software, firmware, hardware, or a combination thereof.

The kernel 131 controls or manages system resources used to perform operations or functions implemented in the middleware 132, the API 133, and the applications 134, and provides an interface through which the middleware 132, the API 133, and the applications 134 may access individual elements of the electronic device 101 to control or manage these elements.

The middleware 132 may function as an intermediary such that the API 133 or the applications 134 communicates with the kernel 131 to transfer data. Furthermore, in relation to task requests received from the applications 134, the middleware 132 performs a control such as scheduling or load-balancing over the task requests, for example, using a method of assigning priorities for using system resources of the electronic device 101 to at least one of the applications 134.

The API 133 is an interface by which the applications 134 control functions provided from the kernel 131 or the middleware 132, and includes, for example, at least one interface or function for file control, window control, image processing, or text control.

According to embodiments, the applications 134 include, for example, Short Message Service (SMS)/Multimedia Message Service (MMS), e-mail, calendar, alarm, health care such as for measuring a work rate or blood sugar, and environment information applications. Additionally or alternatively, the applications 134 may relate to the information exchange between the electronic device 101 and an external electronic device (for example, an electronic device 104), such as a notification relay application for transferring particular information to the external electronic device or a device management application for managing the external electronic device.

For example, the notification relay application includes a function of relaying notification information created by other applications of the electronic device 101 to the external electronic device 104. Additionally or alternatively, the notification relay application receives notification information from an external electronic device 104, and provides the received notification information to a user. The device management application, for example, manages at least some functions such as on/off or display resolution of an external electronic device 104 that communicates with the electronic device 101, applications performed in the external electronic device, or services such as phone call or messaging provided from the external electronic device 104.

According to embodiments, the applications 134 are designated according to the type of the electronic device 104. For example, when the external electronic device is an MP3 player, the applications 134 include an application relating to the reproduction of music. Similarly, when the external electronic device is a mobile medical device, the applications 134 include an application relating to health care. According to an embodiment, the applications 134 include at least one of an application designated for the electronic device 101 and an application received from external electronic devices such as the server 106 or the electronic device 104.

The input/output interface 140 transfers instructions or data, which are input by a user through input/output devices to the processor 120, the memory 130, the communication interface 160, or the positioning module 170 through, for example, the bus 110. For example, the input/output interface 140 provides data, to the processor 120, for a user's touch which is input through the touch screen. The input/output interface 140 outputs, through the input/output devices, instructions or data received through the bus 110 from the processor 120, the memory 130, the communication interface 160, or the positioning module 170. For example, the input/output interface 140 outputs voice data processed by the processor 120 to a user through a speaker.

The display 150 displays various pieces of information to a user.

The communication interface 160 connects communication between the electronic device 101 and the external electronic device 104 or the server 106. For example, the communication interface 160 is connected to a network 162 through wireless or wired communication to communicate with the external device. The wireless communication includes at least one of, for example, Wi-Fi (Wireless Fidelity), Bluetooth® (BT), Near Field Communication (NFC), Global Positioning System (GPS) and cellular communication (for example, Long Term Evolution (LTE), LTE-A, Code Division Multiple Access (CDMA), Wideband CDMA (WCDMA), Universal Mobile Telecommunication System (UMTS), Wireless Broadband (WiBro), and Global System for Mobile communication (GSM)). The wired communication includes at least one of, for example, a Universal Serial Bus (USB), a High Definition Multimedia Interface (HDMI), Recommended Standard 232 (RS-232), and a Plain Old Telephone Service (POTS).

According to an embodiment, the network 162 is a telecommunication network including at least one of a computer network, the Internet, the Internet of Things (IoT), and a telephone network. According to an embodiment, a protocol for communication between the electronic device 101 and the external device may be supported in at least one of the applications 134, the application programming interface 133, the middleware 132, the kernel 131, and the communication interface 160.

The positioning module 170 performs, for example, sensing a first signal relating to an input of the touch object through a first loop unit, sensing a second signal relating to the input of the touch object through a second loop unit, and determining a sensing area including the location where the input is received on the basis of the first signal and determining the input location included in the determined sensing area on the basis of the second signal.

The function/functions or operation/operations performed by the positioning module 170 may also be configured to be performed by the processor 120 according to embodiments. A detailed description of the positioning module 170 will be provided below.

Figure 2:
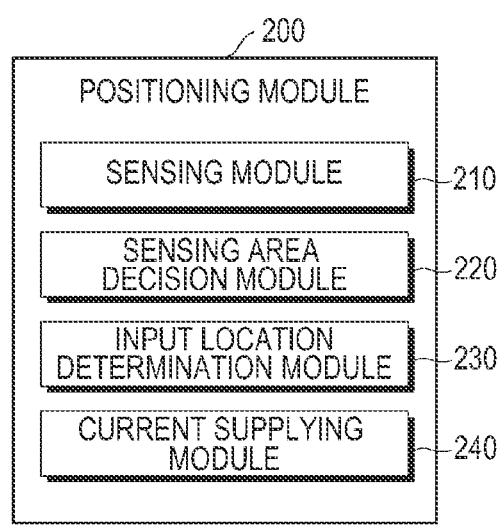
FIG. 2 is a block diagram of a positioning module of a sensing device, according to embodiments of the present invention.

FIG. 2 is a block diagram of a positioning module of an electronic device 101, according to embodiments of the present invention. FIG. 2 will be described in reference to the loop units illustrated in FIG. 4.

The positioning module 200 includes a sensing module 210, a sensing area decision module 220, an input location determination module 230, and a current supplying module 240.

The sensing module 210 senses a first signal relating to an input of a touch object through a first loop unit (400, 410, 420, and 430) and senses a second signal relating to an input of the touch object through a second loop unit (402, 404, 412, 414, 422, 424, 432, and 434). When the first loop unit (400, 410, 420, and 430) included in the sensing module 210 senses a change in a magnetic field depending on a touch of the touch object, the sensing area decision module 220 determines the sensing area where the touch is made. The sensing area determined by the sensing area decision module 220 indicates a candidate area where the input location is likely to be included.

The sensing module 210 receives a signal input to the sensing device from the outside, such as a signal generated from a touch object that outputs a predetermined electromagnetic field, such as an electromagnetic induction pen or a manual electromagnetic induction pen. The electromagnetic induction pen existing around the sensing module 210 receives an induced electromagnetic field from the sensing module 210 and re-discharges the induced electromagnetic field. The electromagnetic induction pen is illustrative for the description of the present invention, and any unit capable of receiving and re-discharging an electromagnetic field may be used as the touch object without any limitations. The sensing module 210 not only senses the input signal, but also outputs a predetermined transmission signal. The transmission signal may be input to the electromagnetic induction pen and then re-discharged from the electromagnetic induction pen.

The input location determination module 230 determines the input location of the touch object based on the determined sensing candidate area and the second signal sensed by the sensing module 210. The second signal may be sensed by the second loop unit (402, 404, 412, 414, 422, 424, 432, and 434) included in the sensing module 210.

The current supplying module 240, which creates current and outputs the current to the sensing module 210, includes a unit that stores predetermined power and creates a preset magnitude of current. The sensing module 210 senses the first and second signals from a change in the current supplied by the current supplying module 240. The first signal corresponds to a change in the magnetic field sensed by the first loop unit (400, 410, 420, and 430) in order to determine the sensing candidate area. The second signal corresponds to a change in the magnetic field sensed by the second loop unit (402, 404, 412, 414, 422, 424, 432, and 434) in order to determine the sensing area from the sensing candidate area and to determine the input location included in the sensing area.

The first loop unit (400, 410, 420, and 430) and the second loop unit (402, 404, 412, 414, 422, 424, 432, and 434) include sub-loops, such as the sub-loop 400 included in the first loop unit and the sub-loop 402 included in the second loop unit. A detailed description thereof will be made below in relation to FIG. 4.

Figure 3:
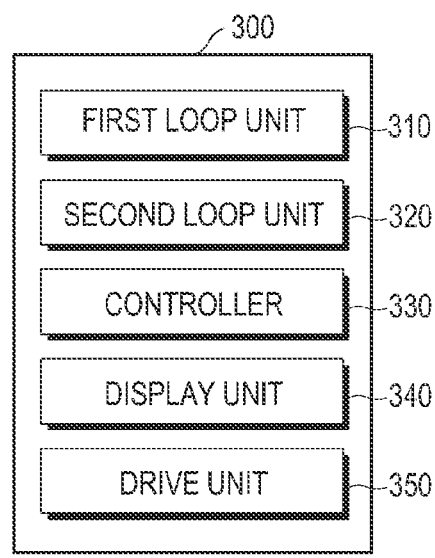
FIG. 3 illustrates a sensing device according to embodiments of the present invention.

FIG. 3 illustrates a sensing device according to embodiments of the present invention.

Referring to FIG. 3, the sensing device 300 includes a first loop unit 310, a second loop unit 320, a controller 330, a display unit 340, and a drive unit 350.

The first loop unit 310 includes at least one sub-loop. The first loop unit 310 senses a first signal for determining a sensing candidate area where a touch is made by the touch object. The first signal is based on a change in the magnetic field according to the access of the touch object to the display unit 340.

The second loop unit 320 includes at least one sub-loop, in the manner of the first loop unit 310. The second loop unit 320 determines the sensing area and the input location of the touch object which is included in the sensing area, based on a second signal. The second signal is based on a change in the magnetic field according to the access of the touch object to the display unit 340.

The controller 330 is electrically connected to the individual elements included in the sensing device 300, according to the embodiments of the present invention, to control the elements, and is preferably a processor such as a CPU.

The display unit 340, such as a touch screen, displays various types of information to the user. When the display unit 340 is embodied as the touch screen, the display unit 340 receives a touch input from the touch object. The touch includes various gestures, such as hovering, at least one tap, a drag, or a swipe for the touch screen.

The drive unit 350 creates a predetermined magnitude of current and outputs the current to the first and second loop units 310 and 320. The drive unit 350 includes a unit that stores predetermined power and creates a preset magnitude of current.

Figure 4:
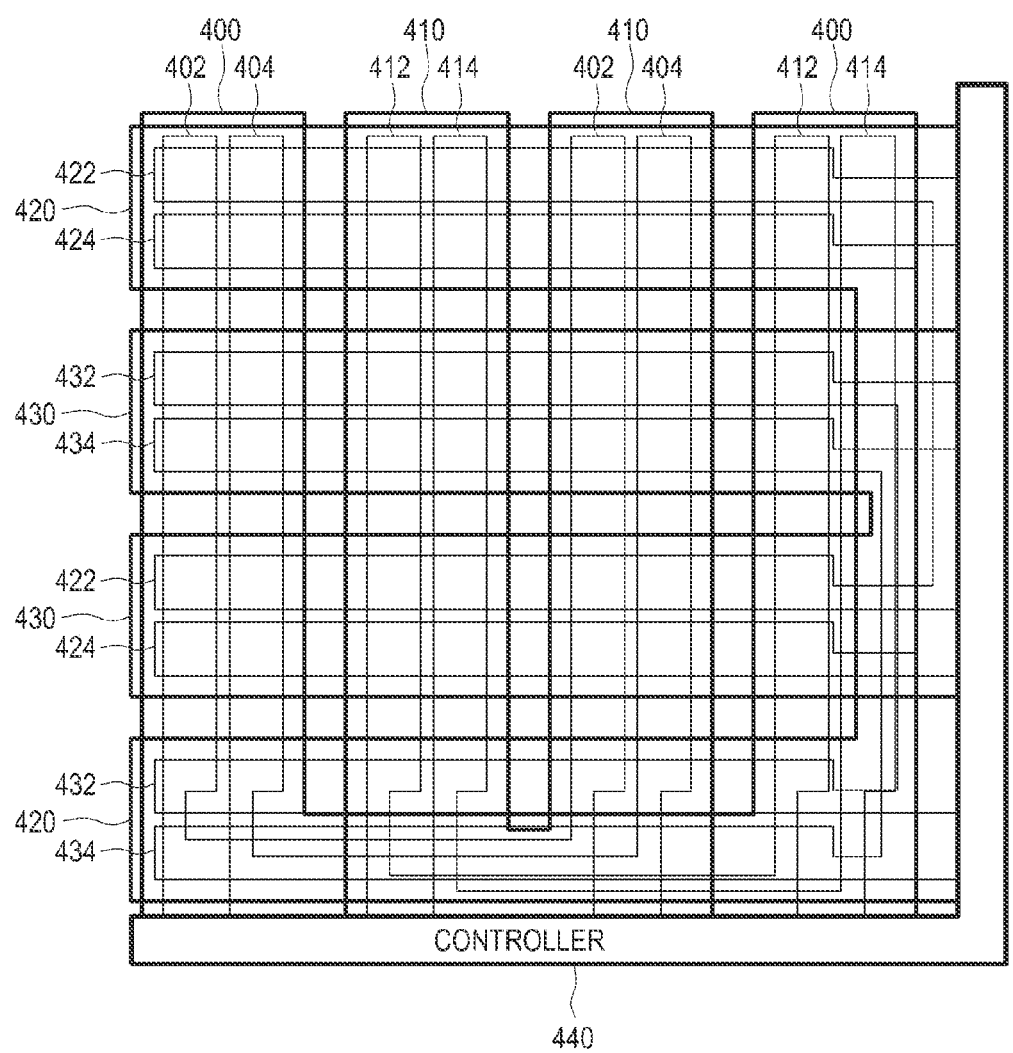
FIG. 4 illustrates configurations of first and second loop units according to embodiments of the present invention.

FIG. 4 illustrates configurations of first and second loop units according to embodiments of the present invention.

Referring to FIG. 4, the first loop unit (400, 410, 420, and 430) and the second loop unit (402, 404, 412, 414, 422, 424, 432, and 434) include at least one sub-loop as described above. In addition, the first loop unit (400, 410, 420, and 430) and the second loop unit (402, 404, 412, 414, 422, 424, 432, and 434) are electrically connected to a controller 440. The first loop unit (400, 410, 420, and 430) senses a sensing area, and the second loop unit (402, 404, 412, 414, 422, 424, 432, and 434) determines an input location of the touch object which is included in the sensing area. At least one of sub-loops 402 and 404 included in the second loop unit (402, 404, 412, 414, 422, 424, 432, and 434) is arranged to be included in at least one sub-loop (for example, the sub-loop 400) which is included in the first loop unit (400, 410, 420, and 430).

The first loop unit (400, 410, 420, and 430) and the second loop unit (402, 404, 412, 414, 422, 424, 432, and 434) may be connected to each other in series, and the sub-loops may also be connected in series. The first loop unit (400, 410, 420, and 430), the second loop unit (402, 404, 412, 414, 422, 424, 432, and 434), and the sub-loops may be wound one or more times, may have predetermined areas, and may be rectangular in shape.

Figure 5:
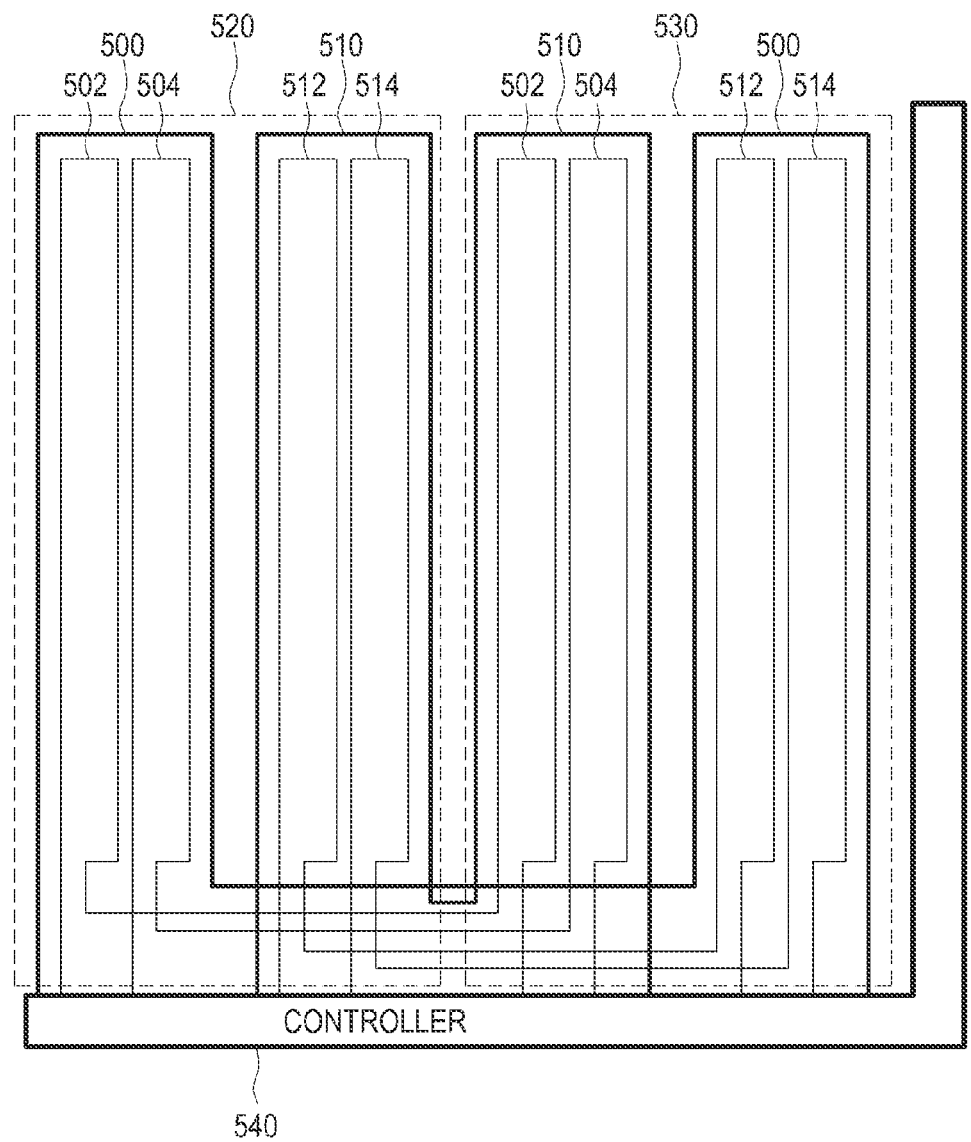
FIG. 5 illustrates the first and second loop units arranged along the X-axis in the arrangement of the first and second loop units illustrated in FIG. 4.

FIG. 5 illustrates the first and second loop units arranged along the X-axis in the arrangement of the first and second loop units illustrated in FIG. 4.

Referring to FIG. 5, one portion of the first loop unit (400, 410, 420, and 430) is included in a first sub-area 520, and the remaining portion thereof is included in a second sub-area 530 different from the first sub-area 520. As illustrated in FIG. 5, sub-loop 502 of the first loop unit included in the first sub-area extends to the second sub-area 530 to from sub-loops included in the second sub-area 530, such as sub-loop 502. In FIG. 5, the first loop unit (500 and 510) and the second loop unit (502, 504, 512, and 514) are illustrated to be arranged with respect to the X-axis for convenience of description. However, the above description of FIG. 5 may also be identically applied to the first loop unit (500 and 510) and the second loop unit (502, 504, 512, and 514) arranged with respect to the Y-axis.

Figure 6A:
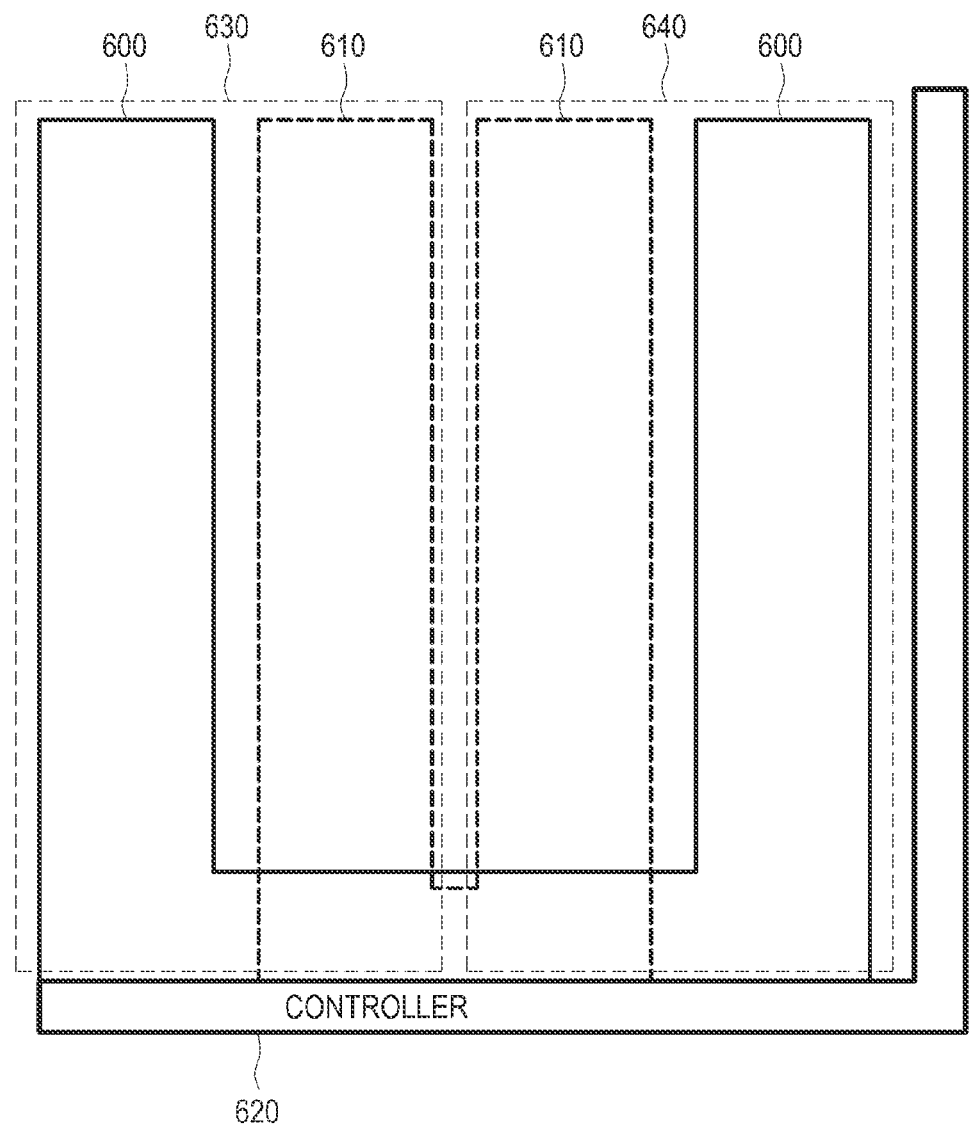
FIG. 6A illustrates the first loop unit arranged along the X-axis in the arrangement of the first and second loop units illustrated in FIG. 5.

FIG. 6A illustrates the first loop unit arranged along the X-axis in the arrangement of the first and second loop units illustrated in FIG. 5.

Referring to FIG. 6A, at least one sub-loop included in a first loop unit, sub-loops 600 and 610 arranged in a first sub-area 630, extends to a second sub-area 640. For reference, the sub-loops 610 included in the sub-areas 630 and 640 are illustrated by dotted lines in FIG. 6 for distinction from the sub-loops 600 shown by solid lines. The first loop unit (600 and 610) is electrically connected to a controller 620. Similar to the description of FIG. 5, the description of FIG. 6A may also be identically applied to the first loop unit (600 and 610) arranged with respect to the Y-axis. For reference, a sub-loop included in the first loop unit is referred to herein as a "first sub-loop," and a sub-loop included in the second loop unit is referred to herein as a "second sub-loop" for conciseness.

Figure 6B:
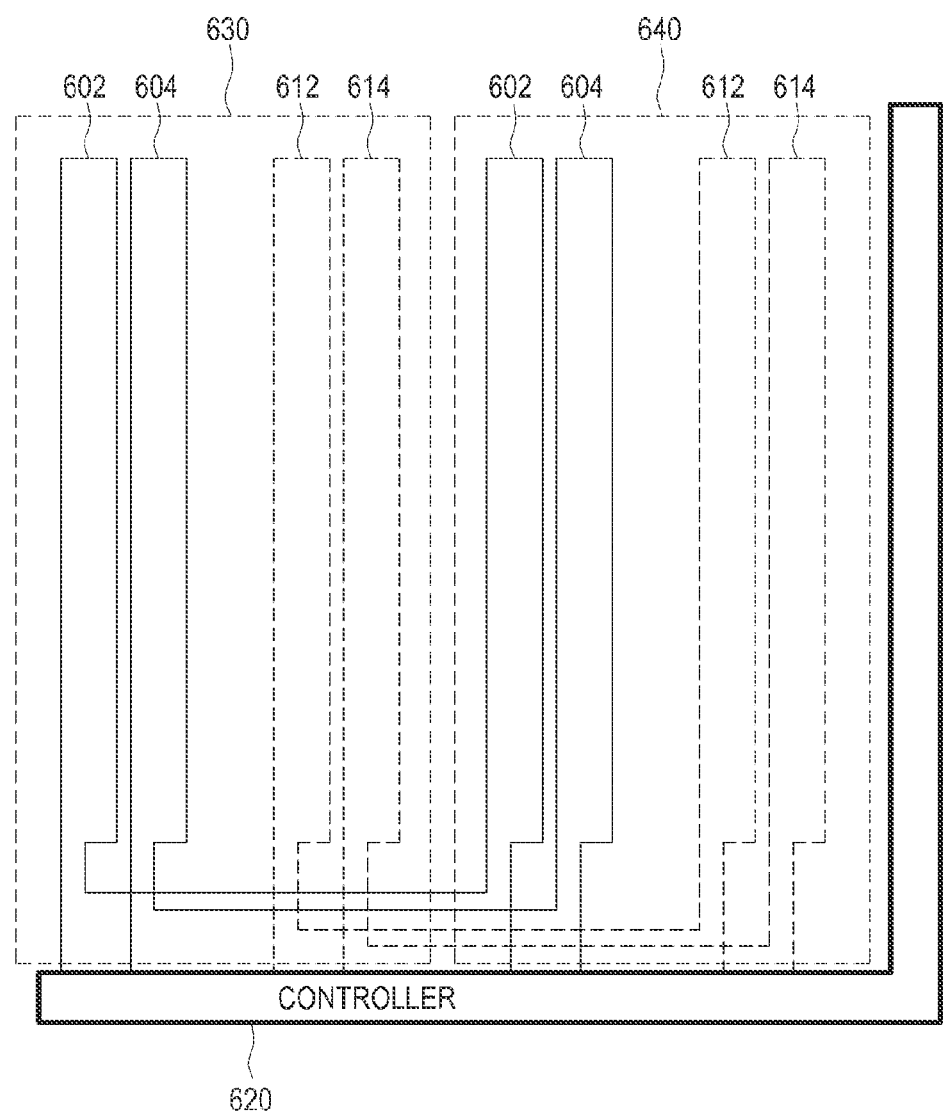
FIG. 6B illustrates the second loop unit arranged along the X-axis in the arrangement of the first and second loop units illustrated in FIG. 5.

FIG. 6B illustrates the second loop unit arranged along the X-axis in the arrangement of the first and second loop units illustrated in FIG. 5.

Referring to FIG. 6B, a second loop unit (602, 604, 612, and 614) is arranged to be included in the first sub-area 630 and the second sub-area 640. As illustrated in FIG. 6B, sub-loop 602 included in the first sub-area 630 extends to the second sub-area 640. The second loop unit (602, 604, 612, and 614) may be electrically connected to the controller 620.

Figure 7A:
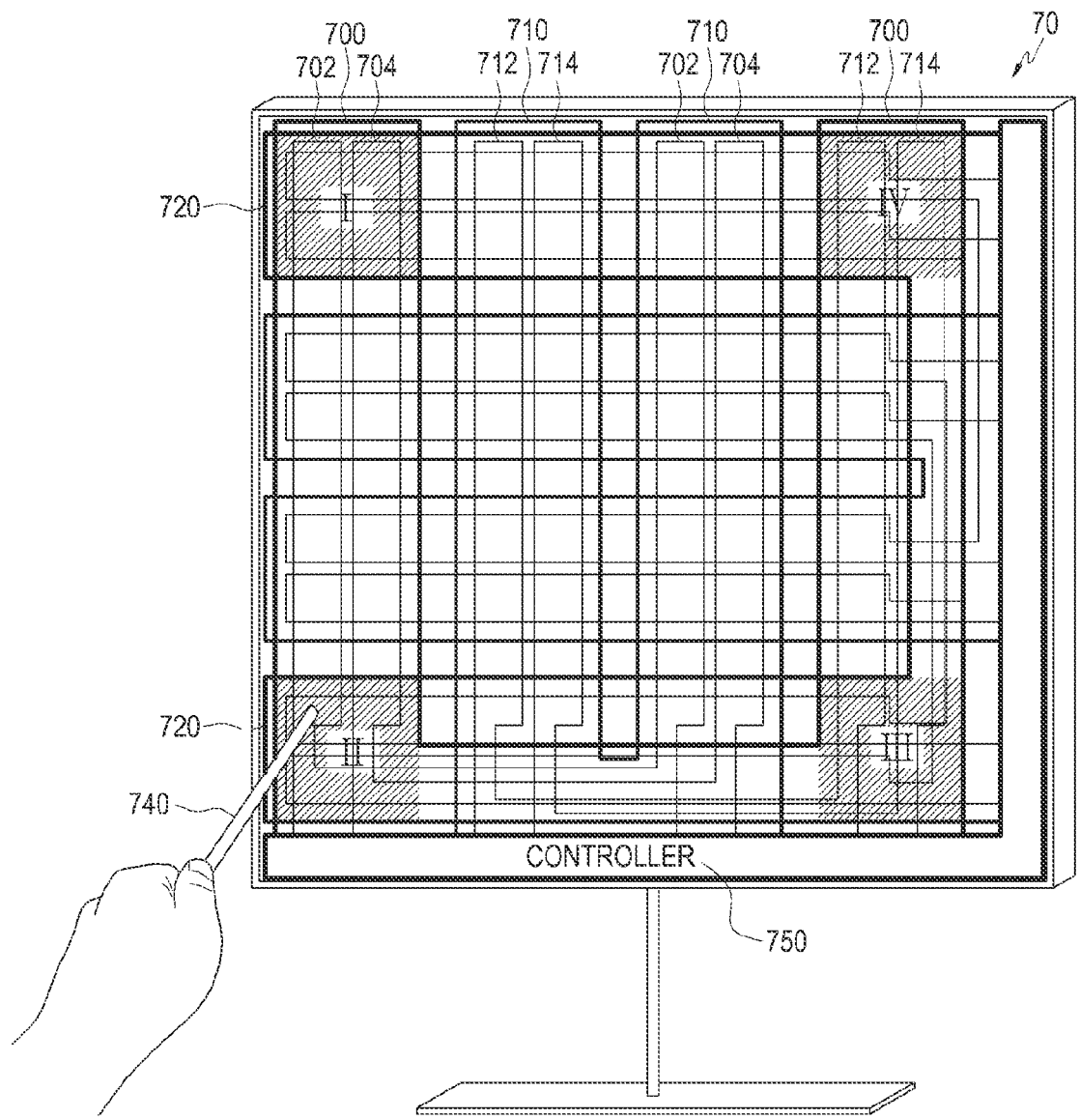
FIGS. 7A and 7B illustrate applying a sensing device to an electronic device, according to embodiments of the present invention.
Figure 7B:
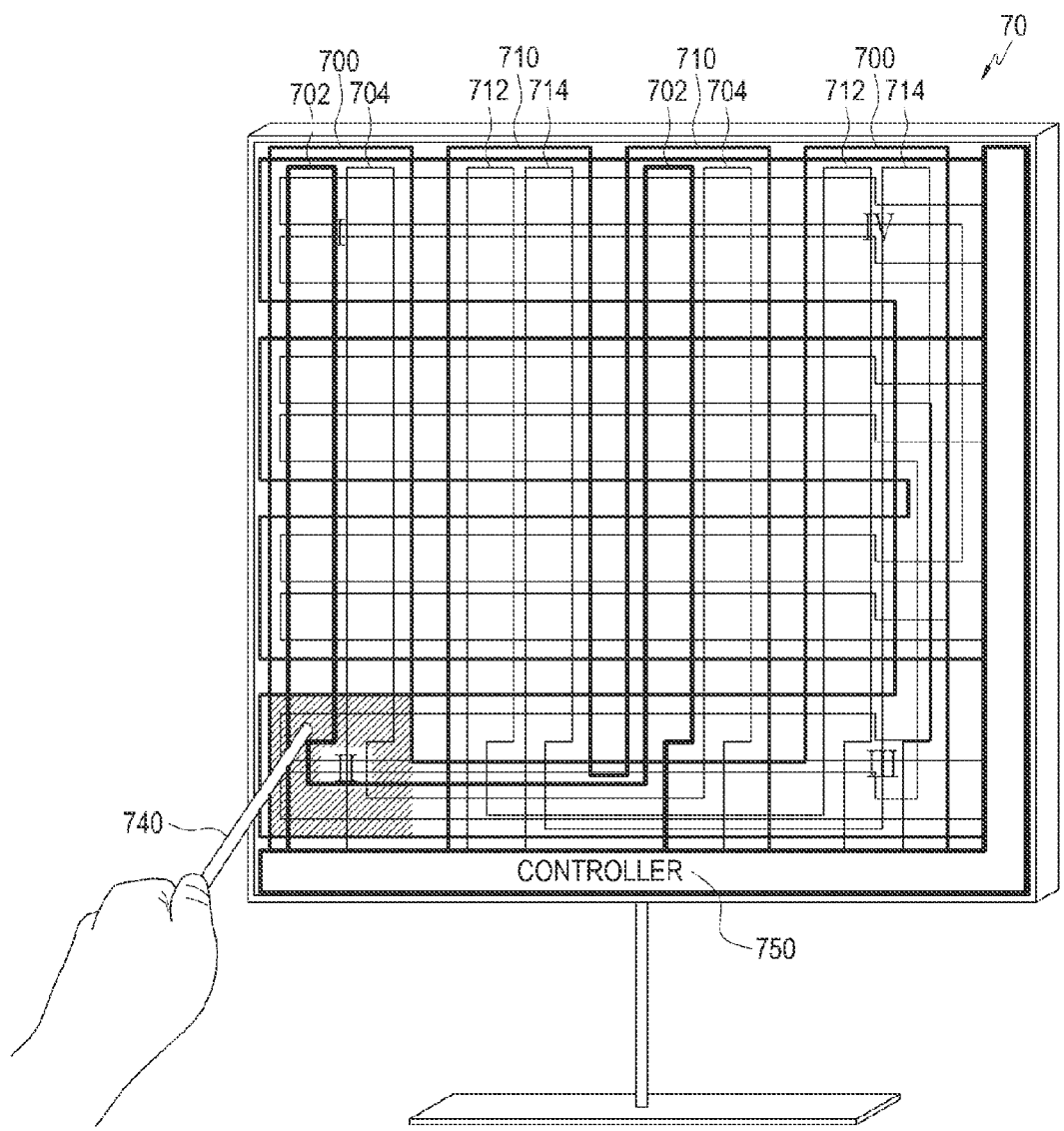

FIGS. 7A and 7B illustrate applying a sensing device to an electronic device, according to embodiments of the present invention.

FIG. 7A, illustrates when the sensing device is applied to an electronic bulletin board 70. The electronic bulletin board 70 is mentioned as an example for convenience of description of the present invention, and the sensing device may also be embodied through the various electronic devices described above.

When a user touches any one portion of the electronic bulletin board 70 with a touch object 740, a controller determines a candidate sensing area on the basis of a loop including sub-loop 700 and sub-loop 720, which senses the maximum sensing signal (i.e., a first signal) for a change in a magnetic field. Furthermore, since sub-loops of a first loop unit (700 and 710) extend over first and second sub-areas as described above, the extending sub-loops identically sense the change in the magnetic field according to the first signal. That is, since the maximum sensing signal according to the touch of the touch object 740 is sensed by the sub-loops 700 and 720 as illustrated in FIG. 7A, the controller 750 determines the area where the sub-loops 700 and 720 intersect with each other as sensing candidate areas (I, II, III, and IV).

Referring to FIG. 7B, a second loop unit 702 senses a second signal generated according to the touch of the touch object. The controller 750 determines one area (II) among the sensing candidate areas (I, II, III, and IV) as a sensing area based on the sub-loop 702 where the second signal is sensed. The controller 750 determines the input location where the touch is made, only by scanning the decided sensing area (II).

As described above, according to the embodiments of the present invention, the sub-loops 700 and 710 constituting the first loop unit are arranged to include the second loop unit 702 and 704, and the first and second loop units extend over the first sub-area 630 and the second sub-area 640. Accordingly, the input location of the touch object is accurately determined through fewer channels (i.e., fewer sub-loops constituting each loop unit). Furthermore, even though the area of a display increases to a size greater than that of an electronic device such as a smart phone, since first and second loop units are uniformly arranged over the entire area of the display, a change in a magnetic field is uniformly sensed through any portion of the display, thereby accurately determining the location where a touch is made.

Figure 8:
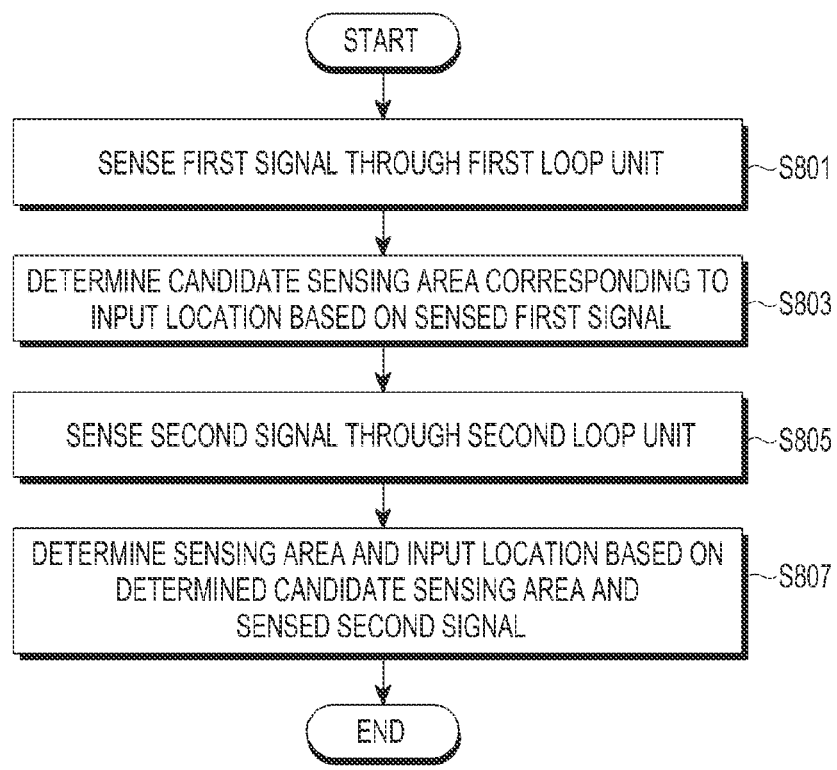
FIG. 8 is a flowchart illustrating a control method of a sensing device according to embodiments of the present invention.

FIG. 8 is a flowchart illustrating a control method of a sensing device according to embodiments of the present invention.

Referring to FIG. 8, the sensing device senses a first signal through a first loop unit in step S800, and determines a candidate sensing area corresponding to an input location based on the sensed first signal in step S810. The sensing device senses a second signal through a second loop unit in step S820, and determines a sensing area and the input location where a touch of a touch object is made based on the determined candidate sensing area and the sensed second signal in step S830. For contents not described in relation to FIG. 8, the descriptions of the sensing device may be identically applied, and therefore, a detailed description thereof will be omitted.

Figure 9:
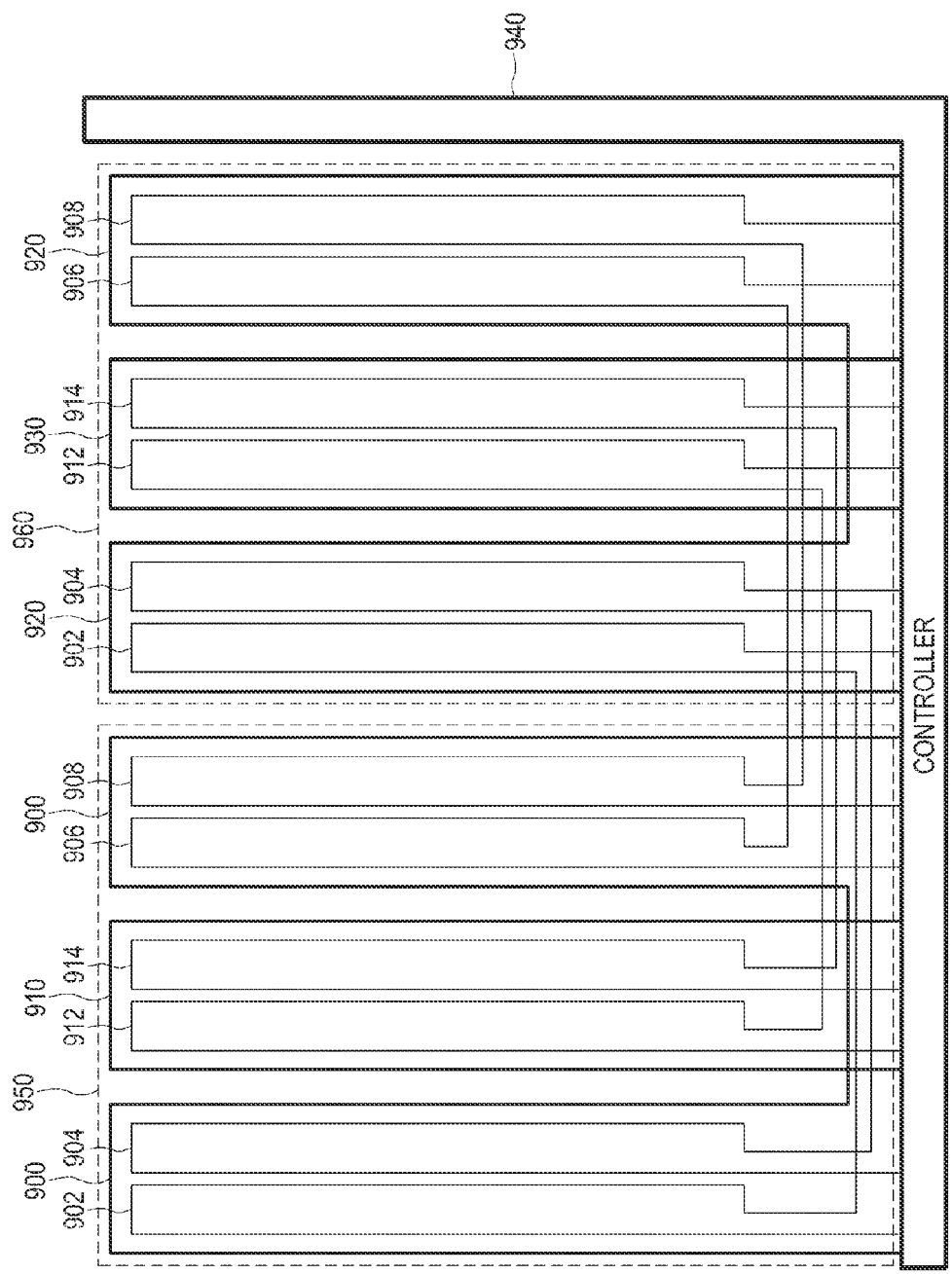
FIG. 9 illustrates a sensing device as an embodiment different from the sensing device, according to embodiments of the present invention, described with reference to FIG. 4.

FIG. 9 illustrates a sensing device as an embodiment different from the sensing device, according to embodiments of the present invention, described with reference to FIG. 4.

Referring to FIG. 9, first sub-loops arranged in each of sub-areas 950 and 960 are not repetitively arranged in another sub-area. That is, as illustrated in FIG. 9, only the first sub-loops 900 and 910 are arranged in sub-area 950, and the sub-loops 900 and 910 arranged in sub-area 950 are not arranged in the sub-area 960 different from sub-area 950. According to the sensing device illustrated in FIG. 9, the input location of a touch object is accurately determined through fewer channels. Furthermore, even though the area of a display increases to a size greater than that of an electronic device such as a smart phone, since the first and second loop units are uniformly arranged over the entire area of the display, a change in a magnetic field is uniformly sensed through any portion of the display, thereby accurately determining the location where a touch is made.

In FIG. 9, the first and second loop units are illustrated with respect to the X-axis for convenience of description. However, the above description of FIG. 9 is identically applied to when the first and second loop units are arranged with respect to the Y-axis. In addition, in an embodiment of the present invention, the first and second loop units are preferably arranged along both the X- and Y-axes as illustrated in FIG. 4. Since the description of the sensing device, according to the embodiments of the present invention described above, may be identically applied to the functions/ operations of determining the input location where a touch of the touch object is made, detailed descriptions thereof will be omitted.

Figure 10:
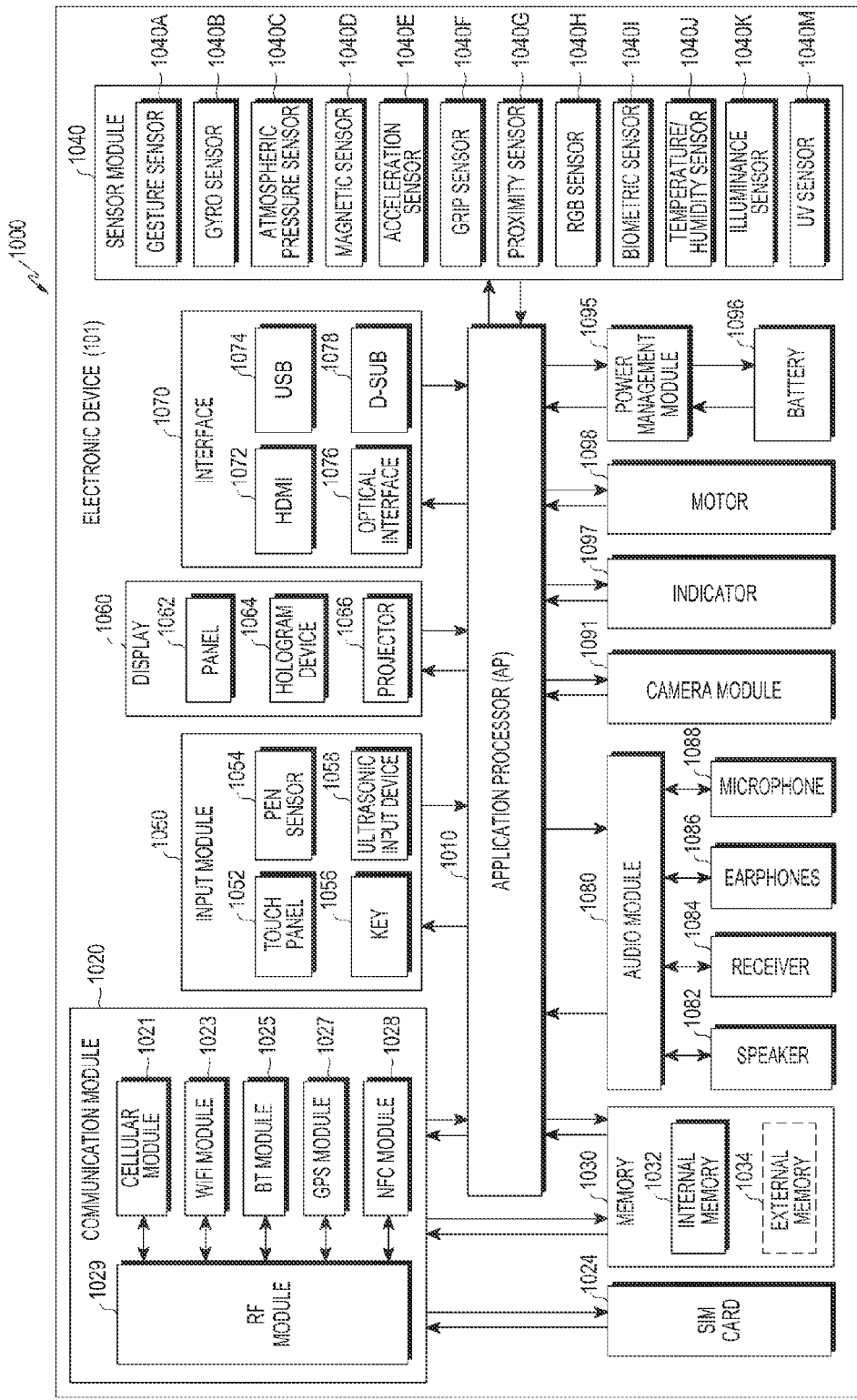
FIG. 10 is a block diagram of an electronic device to which a sensing device or a control method for the sensing device may be applied, according to embodiments of the present invention.

FIG. 10 is a block diagram of an electronic device to which a sensing device or a control method for the sensing device may be applied, according to embodiments of the present invention.

Referring to FIG. 10, the electronic device 1000 is configured as, for example, the entire or a part of the electronic device 101 illustrated in FIG. 1. Referring to FIG. 10, the electronic device 1000 includes at least one Application Processor (AP) 1010, a communication module 1020, a Subscriber Identification Module (SIM) card 1024, a memory 1030, a sensor module 1040, an input device 1050, a display 1060, an interface 1070, an audio module 1080, a camera module 1091, a power management module 1095, a battery 1096, an indicator 1097, and a motor 1098.

The AP 1010 controls a plurality of hardware or software elements connected thereto by driving an operating system or an application program, processes various types of data including multimedia data, and performs calculations. The AP 1010 may be embodied as, for example, a System on Chip (SoC), and may further include a Graphic Processing Unit (GPU).

The communication module 1020 performs data transmission/reception in communication between the electronic device 1000 and other electronic devices such as the electronic device 104 and the server 106 connected thereto through a network. According to an embodiment, the communication module 1020 includes a cellular module 1021, a Wi-Fi module 1023, a BT module 1025, a GPS module 1027, an NFC module 1028, and a Radio Frequency (RF) module 1029.

The cellular module 1021 provides such services as a voice call, a video call, a text message service, and an Internet service through a communication network, and identifies and authenticates an electronic device in a communication network using, for example, a SIM card 1024. According to an embodiment, the cellular module 1021 performs at least some of the functions that the AP 1010 provides, such as at least a part of the multimedia control function.

According to an embodiment, the cellular module 1021 includes a Communication Processor (CP) and is embodied as, for example, an SoC. Although the elements such as the cellular module 1021, the memory 1030, and the power managing module 1095 are illustrated as elements separate from the AP 1010 in FIG. 10, the AP 1010 may include at least some of the above-described elements according to an embodiment.

According to an embodiment, the AP 1010 or the cellular module 1021 loads instructions or data received from at least one of a non-volatile memory and other elements connected thereto in a volatile memory, processes the loaded instructions or data, and stores, in a non-volatile memory, data received from or generated by at least one of the other elements.

The Wi-Fi module 1023, the BT module 1025, the GPS module 1027, or the NFC module 1028 includes, for example, a processor for processing data transmitted/received through the corresponding module. Although these modules are illustrated as individual blocks in FIG. 10, at least two of these modules may be included within one Integrated Chip (IC) or one IC package. For example, at least some of the processors corresponding to these modules may be implemented as one SoC.

The RF module 1029 transmits/receives data, such as an RF signal. The RF module 1029 includes, for example, a transceiver, a Power Amp Module (PAM), a frequency filter, or a Low Noise Amplifier (LNA), and may further include a component, such as a conductor or a conducting wire for transmitting/receiving electronic waves over a free air space in wireless communication. Although the cellular module 1021, the Wi-Fi module 1023, the BT module 1025, the GPS module 1027, and the NFC module 1028 are illustrated as sharing one RF module 1029 in FIG. 10, at least one of these modules may transmit/receive an RF signal through a separate RF module.

The SIM card 1024 may be inserted into a slot formed in a particular portion of the electronic device, and includes unique identification information such as an Integrated Circuit Card IDentifier (ICCID), or subscriber information such as an International Mobile Subscriber IDentity (IMSI).

The memory 1030 includes an internal memory 1032 or an external memory 1034. The internal memory 1032 includes at least one of a volatile memory such as a Dynamic Random Access Memory (DRAM), a Static RAM (SRAM), or a Synchronous Dynamic RAM (SDRAM), and a non-volatile memory such as a One Time Programmable Read Only Memory (OTPROM), a Programmable ROM (PROM), an Erasable and Programmable ROM (EPROM), an Electrically Erasable and Programmable ROM (EE-PROM), a mask ROM, a flash ROM, a NAND flash memory, and a NOR flash memory.

According to an embodiment, the internal memory 1032 may be a Solid State Drive (SSD). The external memory 1034 may further include a flash drive, such as a Compact Flash (CF), a Secure Digital (SD), a Micro Secure Digital (Micro-SD), a Mini Secure Digital (Mini-SD), an extreme Digital (xD), or a memory stick. The external memory 1034 may be functionally connected to the electronic device 1000 through various interfaces, and the electronic device 1000 may further include a storage device such as a hard drive.

The sensor module 1040 measures a physical quantity or detects an operating state of the electronic device 1000, and converts the measured or detected information into an electric signal. The sensor module 1040 includes, for example, at least one of a gesture sensor 1040A, a gyro sensor 1040B, an atmospheric pressure sensor 1040C, a magnetic sensor 1040D, an acceleration sensor 1040E, a grip sensor 1040F, a proximity sensor 1040G, a color sensor 1040H (i.e., Red, Green, and Blue (RGB) sensor), a biometric sensor 1040I, a temperature/humidity sensor 1040J, an illumination sensor 1040K, and an Ultra Violet (UV) sensor 1040M. Additionally or alternatively, the sensor module 1040 includes, for example, an E-nose sensor, an ElectroMyoGraphy (EMG) sensor, an ElectroEncephaloGram (EEG) sensor, an ElectroCardioGram (ECG) sensor, an InfraRed (IR) sensor, an iris sensor, and a fingerprint sensor. The sensor module 1040 further includes a control circuit for controlling at least one sensor included therein.

The input device 1050 includes a touch panel 1052, a (digital) pen sensor 1054, a key 1056, or an ultrasonic input device 1058. The touch panel 1052 includes a control circuit, and recognizes a touch input through at least one of, for example, a capacitive type, a resistive type, an infrared type, and an ultrasonic type panel. Physical contact or proximity recognition is possible with the capacitive type panel. The touch panel 1052 may further include a tactile layer that provides a tactile reaction to a user.

The (digital) pen sensor 1054 may be implemented, for example, using a method that is the same as or similar to receiving a user's touch input, or using a separate recognition sheet. The key 1056 includes, for example, a physical button, an optical key, or a keypad. The ultrasonic input device 1058 identifies data by generating an ultrasonic signal through an input tool and detecting a sonic wave through a microphone 1088 in the electronic device 1000, and is capable of wireless recognition. According to an embodiment, the electronic device 1000 receives a user input from an external device connected thereto using the communication module 1020.

The display 1060 includes a panel 1062, a hologram device 1064, and a projector 1066 is a Liquid Crystal Display (LCD), or an Active-Matrix Organic Light Emitting Diode (AM-OLED), for example, and may be embodied to be flexible, transparent, or wearable. The panel 1062 may also be integrated with the touch panel 1052 as a single module. The hologram device 1064 displays a stereoscopic image in the air using interference of light. The projector 1066 projects light onto a screen to display an image. The screen is located inside or outside the electronic device 1000. According to an embodiment, the display 1060 further includes a control circuit for controlling the panel 1062, the hologram device 1064, and the projector 1066.

The interface 1070 includes a High-Definition Multimedia Interface (HDMI) 1072, a Universal Serial Bus (USB) 1074, an optical interface 1076, and a D-subminiature (D-sub) 1078. The interface 1070 may be included in, for example, the communication interface 160 illustrated in FIG. 1. Additionally or alternatively, the interface 1070 includes, for example, a Mobile High-definition Link (MHL) interface, a Secure Digital (SD) card/Multi-Media Card (MMC) interface, or an Infrared Data Association (IrDA) standard interface.

The audio module 1080 bilaterally converts a sound and an electric signal. At least some elements of the audio module 1080 may be included in the input/output interface 140 illustrated in FIG. 1. The audio module 1080 processes voice information input or output through, for example, a speaker 1082, a receiver 1084, earphones 1086, or the microphone 1088.

The camera module 1091 shoots a still image and video and includes one or more image sensors, a lens, an Image Signal Processor (ISP) or a flash.

The power management module 1095 manages electric power of the electronic device 1000 and includes, for example, a Power Management Integrated Circuit (PMIC), a charger Integrated Circuit (IC), or a battery gauge.

The PMIC may be mounted, for example, in integrated circuits or SoC semiconductors. The charging methods are classified into wired charging and wireless charging. The charger IC charges a battery and prevents the inflow of excessive voltage or current from a charger. According to an embodiment, the charger IC includes a charger IC for at least one of the wired charging method and the wireless charging method. Examples of the wireless charging include magnetic resonance charging, magnetic induction charging, and electromagnetic charging, and an additional circuit, such as a coil loop, a resonance circuit, or a rectifier, may be added for the wireless charging.

The battery gauge measures, for example, a residual quantity of the battery 1096, a voltage, a current, or a temperature while charging. The battery 1096 stores or generates electricity and supplies power to the electronic device 1000 using the stored or generated electricity. The battery 1096 includes, for example, a rechargeable battery or a solar battery.

The indicator 1097 displays particular statuses of the electronic device 1000 or a part (for example, the AP 1010) thereof, such as booting, message, and charging statuses. The motor 1098 converts an electric signal into a mechanical vibration. The electronic device 1000 includes a processing device for supporting mobile TV. The processing device for supporting the mobile TV processes media data according to standards, such as Digital Multimedia Broadcasting (DMB), Digital Video Broadcasting (DVB), or media flow.

The above described components of the electronic device according to embodiments of the present invention may be formed of one or more components, and a name of a corresponding component element may be changed based on the type of electronic device. The electronic device according to the present invention includes one or more of the aforementioned components and may further include other additional components, or some of the aforementioned components may be omitted. Some of the components of the electronic device according to the embodiments of the present invention may be combined to form a single entity, and thus, may equivalently execute functions of the corresponding elements prior to the combination.

The "module" used in embodiments of the present invention refers to, for example, a "unit" including one of hardware, software, and firmware, or a combination of two or more of the hardware, software, and firmware. The "module" is interchangeable with a term, such as a unit, a logic, a logical block, a component, or a circuit. The "module" is a unit or a larger part of an integrated component element. The "module" is mechanically or electronically implemented. For example, the "module" according to embodiments of the present invention includes at least one of an Application-Specific Integrated Circuit (ASIC) chip, a Field-Programmable Gate Arrays (FPGAs), and a programmable-logic device for performing operations which have been known or are to be developed hereafter.

According to embodiments, at least a part of a device or a method according to the embodiments of the present invention may be embodied by, for example, a command stored in a computer readable storage medium in a form of a programming module. When he command is executed by one or more processors, the one or more processors may execute a function corresponding to the command. The computer-readable storage medium may be, for example, the memory 100. At least some of the programming modules may be implemented by the processor. At least some of the programming modules include a module, a program, a routine, a set of instructions or a process for performing one or more functions.

The computer readable recording medium includes magnetic media such as a hard disc, a floppy disc, and a magnetic tape, optical media such as a Compact Disc Read Only Memory (CD-ROM) and a Digital Versatile Disc (DVD), magneto-optical media such as a floptical disk, and hardware devices specifically configured to store and execute program commands, such as a ROM, a Random Access Memory (RAM), and a flash memory. In addition, the program instructions include high class language codes, which can be executed in a computer by using an interpreter, as well as machine codes made by a compiler. The aforementioned hardware device may be configured to operate as one or more software modules in order to perform the operation of embodiments of the present invention, and vice versa.

A module or a programming module according to the present invention includes at least one of the described component elements, a few of the component elements may be omitted, or additional component elements may be included. Operations executed by a module, a programming module, or other component elements according to embodiments of the present invention may be executed sequentially, in parallel, repeatedly, or in a heuristic manner. Further, some operations may be executed according to another order or may be omitted, or other operations may be added.

According to embodiments, a storage medium is provided in which instructions are stored, wherein the instructions are configured to allow at least one processor to perform one or more operations when executed by the at least one processor, and the one or more operations includes sensing a first signal relating to an input of the touch object through a first loop unit, sensing a second signal relating to the input of the touch object through a second loop unit, and determining a sensing area including the location where the input is received based on the first signal and determining the input location included in the determined sensing area based on the second signal.

Embodiments of the present invention provided in the present specifications and drawings are merely certain examples to readily describe the technology associated with embodiments of the present invention and to help understanding of the embodiments of the present invention, but may not limit the scope of the embodiments of the present invention. Therefore, in addition to the embodiments disclosed herein, the scope of the embodiments of the present invention should be construed to include all modifications or modified forms drawn based on the technical idea of the embodiments of the present invention.

While the present invention has been shown and described with reference to certain embodiments thereof, it will be understood by those skilled in the art that various changes in form and details may be made therein without departing from the scope of the present invention. Therefore, the scope of the present invention should not be defined as being limited to the embodiments, but should be defined by the appended claims and equivalents thereof.

What is claimed is:

1. A sensing device for determining an input location of a touch object, comprising:
    a first loop unit including a plurality of first loops, configured to output a first signal relating to an input of the touch object, wherein each of the plurality of first loops includes at least two first sub-loops;
    a second loop unit including a plurality of second loops, configured to output a second signal relating to the input of the touch object, wherein each of the plurality of second loops includes at least two second sub-loops; and
    a controller configured to determine a sensing area including an input location where the input is received based on the first signal and to determine the input location included in the sensing area based on the second signal,
    wherein one of the second sub-loops overlaps one of the first sub-loops and the other of the second sub-loops does not overlap the other of the first sub-loops, and
    wherein one of the first sub-loops overlaps an entire area of one of the second sub-loops.

2. The sensing device of claim 1, wherein the first sub-loops are arranged in a shape of including a periphery of the second sub-loops.

3. The sensing device of claim 2, the first sub-loops are arranged to alternately include the second sub-loops.

4. The sensing device of claim 2, wherein the sensing area comprises a plurality of sub-areas, and the first sub-loops are not repetitively arranged between the plurality of sub-areas.

5. The sensing device of claim 1, further comprising:
    a drive unit configured to supply current for sensing the input of the touch object to the first loop unit and the second loop unit.

6. The sensing device of claim 2, wherein the controller is further configured to determine the sensing area and the input location by comparing magnitudes of the first and second signals sensed by the first sub-loops and the second sub-loops.

7. A control method of a sensing device for determining an input location of a touch object, comprising:
    outputting, by a first loop unit including a plurality of first loops, a first signal relating to an input of the touch object, wherein each of the plurality of first loops includes at least two first sub-loops;
    outputting, by a second loop unit including a plurality of second loops, a second signal relating to the input of the touch object, wherein each of the plurality of second loops includes at least two second sub-loops;
    determining a sensing area including an input location where the input is received based on the first signal; and
    determining the input location included in the sensing area based on the second signal,
    wherein one of the second sub-loops overlaps one of the first sub-loops and the other of the second sub-loops does not overlap the other of the first sub-loops, and
    wherein one of the first sub-loops overlaps an entire area of one of the second sub-loops.

8. The control method of the sensing device of claim 7, wherein the first sub-loops are arranged in a shape of including a periphery of the second sub-loops.

9. The control method of the sensing device of claim 8, wherein the first sub-loops are arranged to alternately include the second sub-loops.

10. The control method of the sensing device of claim 8, wherein the sensing area comprises a plurality of sub-areas, and the first sub-loops are not repetitively arranged between the plurality of sub-areas.

11. The control method of the sensing device of claim 7, further comprising:
    supplying current for sensing the input of the touch object to the first loop unit and the second loop unit.

12. The control method of the sensing device of claim 8, wherein determining the sensing area and determining the input location comprises:
    determining the sensing area and determining the input location by comparing magnitudes of the first and second signals sensed by the first sub-loops and the second sub-loops.

13. A non-transitory computer readable recording medium having recorded thereon instructions configured to perform at least one operation by a processor, wherein the at least one operation comprises:
    outputting, by a first loop unit including a plurality of first loops, a first signal relating to an input of the touch object, wherein each of the plurality of first loops includes at least two first sub-loops;
    outputting, by a second loop unit including a plurality of second loops, a second signal relating to the input of the touch object, wherein each of the plurality of second loops includes at least two second sub-loops;
    determining a sensing area including an input location where the input is received based on the first signal; and
    determining the input location included in the sensing area based on the second signal, wherein one of the second sub-loops overlaps one of the first sub-loops and the other of the second sub-loops does not overlap the other of the first sub-loops, and wherein one of the first sub-loops overlaps an entire area of one of the second sub-loops.

* * * * *